United States Patent Office 3,239,723
Patented Mar. 8, 1966

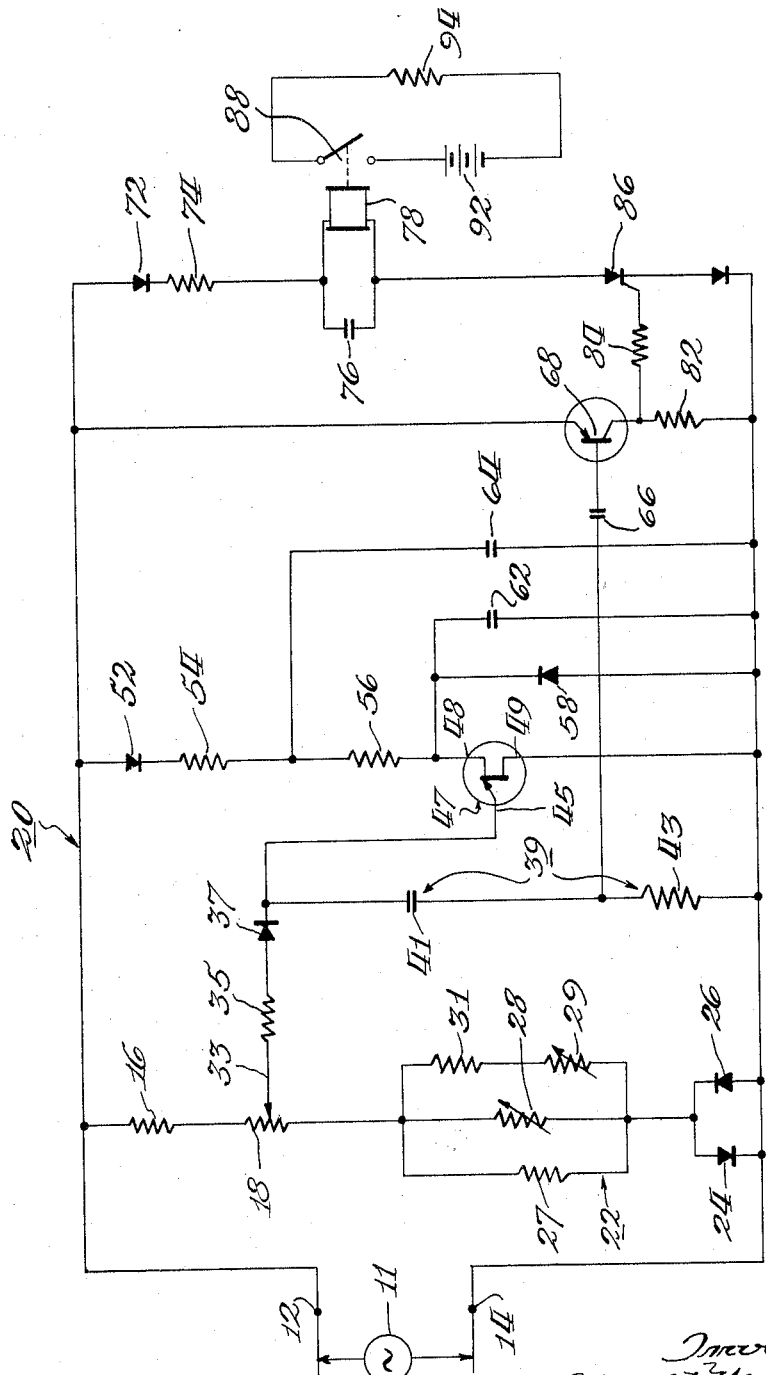

3,239,723
ALTERNATING CURRENT VOLTAGE SENSOR
Harold Washington, Broadview, Branko Vranich, Wheaton, and Jack E. Goodsell, West Chicago, Ill., assignors, by mesne assignments, to Hurletron-Whittier, Inc., Whittier, Calif., a corporation of California
Filed Jan. 30, 1963, Ser. No. 255,002
9 Claims. (Cl. 317—148.5)

This invention relates to apparatus for sensing accurately the attainment of a preassigned voltage threshold by an input alternating signal and more particularly to an arrangement of lightweight semiconductor elements for generating an output signal accurately indicative of such attainment.

There have been known heretofore various voltage sensing arrangements employing various semiconductor devices as circuit elements for deriving an output signal upon the arrival of the voltage sensed at a preassigned threshold of interest. A typical such arrangement is disclosed for example in the General Electric Transistor Manual, sixth edition, pages 196–197.

In that arrangement an input signal is applied across parallel connected, oppositely poled, voltage regulating diodes to the control electrode, i.e., the emitter electrode, of a unijunction transistor. The two base electrodes of this unijunction transistor are connected in series with a transformer primary winding. Thus, as the input signal achieves a threshold voltage, the transistor conducts and drives output conduction pulses to this transformer under energization of a rectified alternating current source.

A Zener diode and a voltage dividing potentiometer are together connected in parallel across the two transistor base electrodes. These two parallel elements serve to provide stabilized voltages to these base electrodes and between these latter two electrodes and the controlling emitter electrode.

Thus, so long as the input signal remains above a preassigned threshold, output pulses will be delivered to the transformer in coincidence with forwardly poled excursions of the rectified alternating power supply.

In accordance with the present invention, it is a principal object to provide an improved circuit arrangement of greater sensitivity but centered around a similar unijunction sensing transistor for self energized delivery of an output signal on the passing of an alternating current input signal above a preassigned voltage threshold.

It is a further object of the invention to provide a circuit arrangement having an amplifying element for providing an output signal of substantial strength with minimum drain on the sensing unijunction transistor.

It is a further object of the invention to insure definiteness and certainty in the rising of an alternating signal above a preassigned threshold by providing structures which cumulatively add repetitive alternating signal excursions above the preassigned threshold to actuate a threshold indicating device.

The achievement of these and other objects of the invention will be more clear from a consideration of the following brief description of an illustrative embodiment of the invention, shown in the drawing, and of the appended claims.

In the drawing, the single figure illustrates an alternating current source for which an output signal is desired indicative of the achievement of a threshold amplitude.

The invention generally comprises a pair of input terminals connected across a series network arrangement of resistors including the well known sensitor and thermistor, a potentiometer, and a pair of oppositely poled, parallel connected diodes. The potentiometer provides an adjustable portion of the input wave to be measured to the controlling, emitter electrode of a unijunction transistor.

This latter transistor emitter electrode, in turn, is connected in series circuit with a rectifying diode across the aforementioned adjustable network to provide an enabling signal to the control base electrode of an amplifying transistor. Conduction electrodes of this transistor are connected to provide an amplified enabling signal to the control electrode of a controllable rectifier diode. This latter diode is connected in series circuit with the operating winding of a relay. This relay is connected, when operated, to deliver an output signal from a source to a load impedance.

Looking now more particularly to the single figure of the drawing, there is seen, symbolically illustrated, a conventional alternating current signal source 11 connected to input terminals 12 and 14 of a threshold responsive semiconductor, circuit arrangement 20 in accordance with the invention.

This arrangement includes, in series across the two input terminals, a current limiting resistor 16, a potentiometer 18, first and second, oppositely poled, parallel connected semiconductor diodes 24 and 26, and a three parallel branch, temperature compensating network 22. The first branch of this network comprises current limiting resistor 27 which clearly acts in concert with resistor 16. The second branch comprises a variable resistance sensitor 28. The third branch comprises a current limiting resistor 31 and, in series, a temperature variable resistance, the thermistor 29. This latter described series arrangement includes elements well known for stabilizing resistance as temperature varies.

A selected portion of the temperature stabilized voltage, thus developed at potentiometer 18, is applied by way of variable tap 33, resistor 35, and rectifying diode 37 to an input circuit 39 for the control, or emitter, electrode 45 of a unijunction transistor 47. This input circuit 39 comprises simply a series connected filter capacitor 41 and resistor 43.

Operation of the circuit elements thus far described may now well be in order. The alternating polarity signal for which it is desired to provide an output signal above preassigned amplitude, is stabilized for temperature by the thermistor and sensistor shown. Similarly, the oppositely poled diodes provide conduction paths for this signal under either of the opposite two alternating voltage cycles. Thus, this input arrangement is rendered amenable to translate temperature stabilized signals of polarity suitable to further circuit employment.

This temperature stabilized signal is applied on alternate cycles by way of rectifying diode 37, to charge capacitor 41 by way of the series path which includes resistor 16, a tapped portion of potentiometer 18, resistor 35, and resistor 43. It is to be noted that the temperature compensating network 22 and a portion of potentiometer 18 are connected in parallel with the noted charging path for capacitor 41.

These series connected resistors are collectively of relatively small value in relation to the capacitor 41. Hence, on each successive positive going cycle of the input wave, the capacitor is charged by a substantially fixed amount. The amount of each charging step may be regulated by adjustment of the tap 33 on potentiometer 18. During negative going portions of the wave, of course, discharge of the capacitor 41 is prevented by the opposite polarity of the diode 37 and by the fact that until a suitable threshold voltage is reached, no conduction takes place across the emitter base electrodes of unijunction transistor 47.

The input signal voltage from terminals 12 and 14 is applied also to the two base electrodes 48 and 49 of the unijunction transistor by way of rectifying diode 52, poled as shown, and series resistors 54 and 56. Zener diode 58 is connected across the two base electrodes in an orientation for conducting in a high resistance direction the current passed by diode 52. Thus, this Zener diode acts to maintain the voltage through the unijunction transistor at or below the Zener voltage.

Capacitors 62 and 64 are, respectively, connected to input terminal 14 from the common terminal of series resistors 54 and 56 and from the common terminal of resistor 56 with transistor 47. In this arrangement, these capacitors provide filtering of spurious signals across the input terminals 12, 14.

The voltage built up across capacitor-resistor arrangement 39 builds up in steps on successive cycles of the alternating input wave. Finally, this voltage appearing at electrode 45 achieves a preassigned threshold. This threshold is governed by the factory placement of the emitter electrode 45 with respect to the two base electrodes 48, 49. At this threshold, conduction takes place under near zero resistance conditions to discharge capacitor 41 through the unijunction transistor 47 and resistor 43.

Thus, a signal is coupled from a point between this resistor and capacitor by way of electrolytic capacitor 66 to turn ON transistor 68 and cause a rising voltage signal to develop across resistor 82.

This rising voltage signal is coupled by way of resistor 84 to turn ON the controlled rectifier 86. Accordingly conduction takes place through diode 72, resistor 74, and the control winding 78 of relay 88.

Parallel connected capacitor 76 acts to smooth the voltage transient across this winding 78. The relay 88 is operated from the illustrated quiescent condition by flow of current in the winding 78. In this fashion power is applied from a source, battery 92, to a load 94 as a preassigned voltage level is achieved across the capacitor-resistor arrangement 39. This voltage is temperature stabilized by the employment of the parallel sensistor 28 and thermistor 38.

The achievement of this voltage is adjustable in accordance with the invention by movement of the tap 33 on potentiometer 17. Thus, according to operator choice, fewer or greater number of cycles of the input alternating voltage are required to charge capacitor 41 to a triggering voltage for the unijunction transistor 47. In this fashion, erratic voltage excursions of individual cycles are eliminated insofar as having a controlling triggering effect on application of power to load 94 is concerned.

At the same time in apparatus in accordance with the invention, the accuracy of the triggering level for power to the load impedance is enhanced by the amplifying and isolation effected by the transistor and control rectifier arrangements employed.

The invention is not limited to the specific embodiment above described. Without departing from the spirit and scope of the invention, it will readily occur to those skilled in the art, that trigger apparatus in accordance with the invention may be readily employed for enabling control by negative input signal peaks. This readily apparent modification simply involves reversal of the polarity of the various functional diodes, transistors, and relays in accordance with the invention.

What is desired to be secured by Letters Patent of the United States is:

1. Trigger apparatus for energizing a load impedance from a power source in response to the achievement of a threshold voltage by an alternating input signal from a signal source which comprises, a first and a second input terminal adapted for connection to said signal source, a direct current relay having an operating winding, a controllable rectifier having a control electrode, said relay winding and said rectifier being connected in series across said terminals for operating said relay upon conduction by said rectifier, a unijunction transistor having first and second conduction, base electrodes connected across said terminals and a control, emitter electrode, a fixed resistor, a capacitor, and a variable resistor connected in series across said terminals, means connecting a terminal intermediate said capacitor and said variable resistor in series with said unijunction transistor emitter electrode, said first base electrode and said fixed resistor for discharging said capacitor upon conduction from said emitter electrode through said first base electrode, thereby to discharge said capacitor through said fixed resistor to develop a discharge operating signal on the common connected terminal of said last named capacitor and resistor and means for coupling said common terminal to said rectifier control electrode.

2. Apparatus as set forth in claim 1 and, in combination therewith, an amplifying transistor connected in signal coupling relation between said last named common terminal and said rectifier control electrode.

3. Apparatus as set forth in claim 1 and, in combination therewith, temperature compensating means connected in circuit across said input terminals.

4. Apparatus as set forth in claim 3 wherein said compensating means comprises a thermistor and a sensistor connected in parallel between said first and second input terminals.

5. Apparatus as set forth in claim 1 and, in combination therewith, Zener diode rectifying means connected in circuit across said first and second base electrodes, said rectifying means being poled in a high resistance direction for currents flowing between said base electrodes corresponding to discharge by said capacitor, whereby the discharge voltage between said base electrodes is limited to a fixed value.

6. Apparatus for energizing a load impedance from a power source upon attainment of a preassigned threshold by an alternating wave from a signal source which comprises, first and second input terminals adapted for connection to said signal source, an adjustable impedance input arrangement connected across said terminals, said arrangement comprising a first resistor, a capacitor, a rectifying element and a second resistor connected consecutively in series, a unijunction transistor having first and second base, conduction electrodes connected in circuit with said input terminals and a control electrode, said control electrode being connected in common with one terminal of said capacitor and one terminal of said rectifying element, control signal responsive switching means for switching said power source in circuit with said load impedance and means for applying a control signal to said switching means said last named applying means being connected in circuit between a common terminal of said capacitor and said first resistor.

7. Apparatus as set forth in claim 6 wherein said applying means comprises an amplifying transistor for amplifying signals coupled from said common terminal.

8. Appartus as set forth in claim 6 wherein said applying means comprises a controllable rectifier having a control terminal and a rectifying conduction path connected in series with said switching means, said control terminal being connected in controlled relation with said last named common terminal.

9. Apparatus as set forth in claim 8 comprising a temperature responsive arrangement connected in series with said input terminals for compensating voltage variations in the conduction response of said unijunction transistor in response to variations in ambient temperature of said apparatus.

References Cited by the Examiner

UNITED STATES PATENTS

| | | | |
|---|---|---|---|
| 3,107,320 | 10/1963 | Brittain et al. | 317—148.5 |
| 3,109,910 | 11/1963 | Fogelman | 317—148.52 |
| 3,146,392 | 8/1964 | Sylvan | 317—148.52 |
| 3,178,619 | 4/1965 | Winchel | 317—148.5 |

OTHER REFERENCES

"Using Low Current Silicon Controlled Rectifiers and Switches," Application Note 200.19, General Electric Co., March 1962, p. 12.

Notes on the application of the Silicon Unijunction Transistor, Semiconductor Products Dept., Applications Engineering, General Electric Co., May 1961, pp. 37, 41, 42.

SAMUEL BERNSTEIN, *Primary Examiner.*

L. T. HIX, *Assistant Examiner.*